United States Patent
Kydd

(10) Patent No.: US 12,071,036 B2
(45) Date of Patent: Aug. 27, 2024

(54) MINIMUM COST DEMAND CHARGE MANAGEMENT BY ELECTRIC VEHICLES

(71) Applicant: NetZero V2G Technologies LLC, Fort Washington, PA (US)

(72) Inventor: Paul Harriman Kydd, Lawrenceville, NJ (US)

(73) Assignee: NETZERO V2G TECHNOLOGIES LLC, Fort Washington, PA (US)

( * ) Notice: Subject to any disclaimer, the term of this patent is extended or adjusted under 35 U.S.C. 154(b) by 0 days.

(21) Appl. No.: 16/563,108

(22) Filed: Sep. 6, 2019

(65) Prior Publication Data
US 2021/0370795 A1    Dec. 2, 2021

(51) Int. Cl.
| | | |
|---|---|---|
| H02J 7/00 | (2006.01) | |
| B60L 3/00 | (2019.01) | |
| B60L 53/60 | (2019.01) | |
| B60L 55/00 | (2019.01) | |
| H02J 9/00 | (2006.01) | |

(52) U.S. Cl.
CPC ............ B60L 55/00 (2019.02); B60L 3/0046 (2013.01); B60L 53/60 (2019.02); H02J 7/0029 (2013.01); H02J 9/002 (2013.01); H02J 2310/64 (2020.01)

(58) Field of Classification Search
CPC ........ B60L 55/00; B60L 3/0046; B60L 53/60; B60L 53/66; B60L 53/10; B60L 53/18; B60L 53/11; H02J 9/002; H02J 7/0029; H02J 2310/64; H02J 2310/48
See application file for complete search history.

(56) References Cited

U.S. PATENT DOCUMENTS

| | | |
|---|---|---|
| 6,847,937 B1 | 1/2005 | Savage et al. |
| 7,582,979 B2 | 9/2009 | Oyobe et al. |
| 8,227,937 B2 | 7/2012 | Barlock et al. |
| 8,278,881 B2 | 10/2012 | Woody et al. |
| 8,463,449 B2 | 6/2013 | Sanders |
| 8,509,976 B2 | 8/2013 | Kempton |
| 8,575,780 B2 | 11/2013 | Moon |
| 8,599,587 B2 | 12/2013 | Chapman et al. |

(Continued)

OTHER PUBLICATIONS

Beck, Leonard J.; V2G: a text about vehicle-to-grid, the technology which enables a future of clean and efficient electric-powered transportation; 2009—Trzy updated Jul. 2, 2009, Leonard Beck, c2009, Newark, Del., USA.

(Continued)

*Primary Examiner* — Lincoln D Donovan
*Assistant Examiner* — Alex W Lam
(74) *Attorney, Agent, or Firm* — Bergman LLC; Michael Bergman

(57) ABSTRACT

This invention has as its objective provision of a method and apparatus to enable the batteries of Electric Vehicles (EV)s to level the electric demand in buildings to reduce demand charges based on instantaneous demand for electric power. This load leveling is done by connecting the EV to the building electrical system by its conventional Alternating Current (AC) recharging connection, and by an additional Direct Current (DC) path supporting intermittent loads. In this way the EV battery stands between the AC energy source and the intermittent load and reduces the electric power drawn from the grid to a constant minimum level, thereby minimizing demand charges.

8 Claims, 5 Drawing Sheets

(56) References Cited

U.S. PATENT DOCUMENTS

| | | |
|---|---|---|
| 8,716,891 B2 | 5/2014 | Choi |
| 8,768,533 B2 | 7/2014 | Ichikawa |
| 8,772,961 B2 | 7/2014 | Ichikawa |
| 8,957,547 B2 | 2/2015 | Chang et al. |
| 9,263,895 B2 | 2/2016 | Naiknaware et al. |
| 9,276,410 B2 | 3/2016 | Binder et al. |
| 9,293,948 B2 | 3/2016 | Freitas et al. |
| 9,436,179 B1 | 9/2016 | Turney et al. |
| 9,481,259 B2 | 11/2016 | Choi et al. |
| 9,520,623 B2 | 12/2016 | Honma et al. |
| 9,573,478 B2 | 2/2017 | Jefferies et al. |
| 9,577,291 B2 | 2/2017 | Kolavennu et al. |
| 9,584,047 B2 | 2/2017 | Frohman et al. |
| 9,705,333 B2 | 7/2017 | Clifton |
| 9,754,300 B2 | 9/2017 | Kempton et al. |
| 9,758,046 B2 | 9/2017 | Harper et al. |
| 9,783,068 B2 | 10/2017 | Eger et al. |
| 9,796,258 B1 | 10/2017 | Bundschuh et al. |
| 9,821,669 B2 | 11/2017 | Tanabe |
| 9,845,021 B2 | 12/2017 | Yang et al. |
| 9,852,481 B1 | 12/2017 | Turney et al. |
| 9,862,287 B2 | 1/2018 | Tang et al. |
| 9,948,101 B2 | 4/2018 | Chow |
| 9,987,941 B2 | 6/2018 | Miftakhov et al. |
| 10,007,259 B2 | 6/2018 | Turney et al. |
| 10,126,796 B2 | 11/2018 | Dorn et al. |
| 10,137,796 B2 | 11/2018 | Huang et al. |
| 10,140,670 B2 | 11/2018 | Gow |
| 10,166,877 B2 | 1/2019 | Zeng et al. |
| 10,166,882 B2 | 1/2019 | Yang et al. |
| 10,173,543 B2 | 1/2019 | Yang et al. |
| 10,186,865 B2 | 1/2019 | Chiang et al. |
| 10,333,306 B2 | 6/2019 | Hooshmand et al. |
| 10,333,307 B2 | 6/2019 | Hooshmand et al. |
| 10,439,428 B2 | 10/2019 | Kydd |
| 10,693,315 B2 | 6/2020 | Kydd |
| 10,873,210 B2 | 12/2020 | Lowenthal et al. |
| 10,913,370 B2 | 2/2021 | Kubota et al. |
| 11,043,835 B2 | 6/2021 | Kydd |
| 11,264,843 B1 | 3/2022 | Lim et al. |
| 2003/0205936 A1* | 11/2003 | Beckerman .............. B60T 1/10 307/10.1 |
| 2007/0043478 A1 | 2/2007 | Ehlers et al. |
| 2008/0111424 A1 | 5/2008 | Yeh |
| 2009/0179495 A1 | 7/2009 | Yeh |
| 2010/0019577 A1 | 1/2010 | Barlock et al. |
| 2011/0133693 A1 | 6/2011 | Lowenthal et al. |
| 2011/0202192 A1 | 8/2011 | Kempton |
| 2011/0202217 A1 | 8/2011 | Kempton |
| 2011/0202401 A1 | 8/2011 | Kempton et al. |
| 2011/0202418 A1 | 8/2011 | Kempton et al. |
| 2011/0204851 A1 | 8/2011 | Manotas, Jr. |
| 2011/0245987 A1 | 10/2011 | Pratt et al. |
| 2012/0032636 A1 | 2/2012 | Bianco |
| 2012/0106672 A1 | 5/2012 | Shelton et al. |
| 2012/0223675 A1 | 9/2012 | Bianco |
| 2012/0267952 A1* | 10/2012 | Ballatine .............. H02J 7/34 307/26 |
| 2013/0020873 A1 | 1/2013 | Barlock et al. |
| 2013/0080254 A1 | 3/2013 | Thramann |
| 2013/0124005 A1 | 5/2013 | Ichikawa |
| 2013/0141040 A1 | 6/2013 | DeBoer et al. |
| 2013/0313243 A1 | 11/2013 | Gonze et al. |
| 2013/0328527 A1 | 12/2013 | Kang |
| 2014/0062401 A1 | 3/2014 | Gadh et al. |
| 2014/0067140 A1 | 3/2014 | Gow |
| 2014/0277788 A1 | 9/2014 | Forbes, Jr. |
| 2015/0015213 A1 | 1/2015 | Brooks et al. |
| 2015/0097527 A1* | 4/2015 | DeDona ................ B60L 53/18 320/109 |
| 2015/0326012 A1 | 11/2015 | Tsuchiya |
| 2016/0006245 A1 | 1/2016 | Chow |
| 2016/0137082 A1 | 5/2016 | Jefferies et al. |
| 2016/0137087 A1 | 5/2016 | Haas et al. |
| 2016/0137149 A1* | 5/2016 | Kamachi ................ B60L 58/10 307/10.1 |
| 2016/0207409 A1 | 7/2016 | Ueo |
| 2016/0211676 A1 | 7/2016 | Chiang et al. |
| 2016/0294022 A1 | 10/2016 | Thramann et al. |
| 2017/0129356 A1 | 5/2017 | Johnson |
| 2017/0155253 A1 | 6/2017 | Veda et al. |
| 2017/0168516 A1 | 6/2017 | King |
| 2018/0018007 A1 | 1/2018 | Dorn et al. |
| 2018/0037121 A1* | 2/2018 | Narla ........................ H02J 7/35 |
| 2018/0090935 A1 | 3/2018 | Asghari et al. |
| 2018/0105052 A1 | 4/2018 | Patil et al. |
| 2018/0244170 A1 | 8/2018 | Kydd |
| 2019/0036341 A1 | 1/2019 | Asghari et al. |
| 2019/0056451 A1 | 2/2019 | Asghari et al. |
| 2019/0079473 A1 | 3/2019 | Kumar et al. |
| 2019/0131923 A1 | 5/2019 | Hooshmand et al. |
| 2019/0137956 A1 | 5/2019 | Hooshmand et al. |
| 2019/0140465 A1 | 5/2019 | Hooshmand et al. |
| 2019/0147552 A1 | 5/2019 | Nakayama et al. |
| 2019/0148945 A1 | 5/2019 | Nakayama et al. |
| 2019/0206000 A1 | 7/2019 | ElBsat et al. |
| 2019/0288347 A1 | 9/2019 | Yokoyama et al. |
| 2019/0322178 A1 | 10/2019 | Sturza et al. |
| 2019/0369166 A1 | 12/2019 | Moslemi et al. |
| 2020/0031238 A1 | 1/2020 | Kydd |
| 2020/0067400 A1 | 2/2020 | Li et al. |
| 2020/0101850 A1 | 4/2020 | Harty et al. |
| 2021/0273453 A1 | 9/2021 | Nisho et al. |
| 2021/0291670 A1 | 9/2021 | Kaufman et al. |
| 2022/0190639 A1 | 6/2022 | Nelson et al. |
| 2022/0250498 A1 | 8/2022 | Okada et al. |

OTHER PUBLICATIONS

SAE International; SAE Electric Vehicle and Plug in Hybrid Electric Vehicle Conductive Charge Coupler; J1772 Oct. 2012; Issued Oct. 1996; Revised Oct. 2012.

Kristian, Maggie; Great Plains Institute; Pilot Project Gets Solar Panels in Sync with Electric Vehicle Chargers; Jan. 9, 2020; https://betterenergy.org/blog/solar-synchronization-electric-vehicle-chargers/.

Trabish, Herman; Utility Dive; Utilities in hot water: Reqalizing the benefits of grid-integrated water heaters; Jun. 20, 2017; https://www.utilitydive.com/news/utilities-in-hot-water-realizing-the-benefits-of-grid-integrated-water-hea/445241/.

Open vs. Closed Charging Stations: Advantages and Disadvantages; Open Charge Alliance; Aug. 8, 2018; https://www.openchargealliance.org/uploads/files/OCA-Open-Standards-White-Paper-compressed.pdf.

File History for U.S. Appl. No. 14/101,423.
File History for U.S. Appl. No. 15/441,484.
File History for U.S. Appl. No. 16/055,972.
File History for U.S. Appl. No. 16/562,565.
File History for U.S. Appl. No. 16/580,663.
File History for U.S. Appl. No. 17/248,576.
File History for U.S. Appl. No. 17/330,662.
File History for U.S. Appl. No. 17/333,236.

* cited by examiner

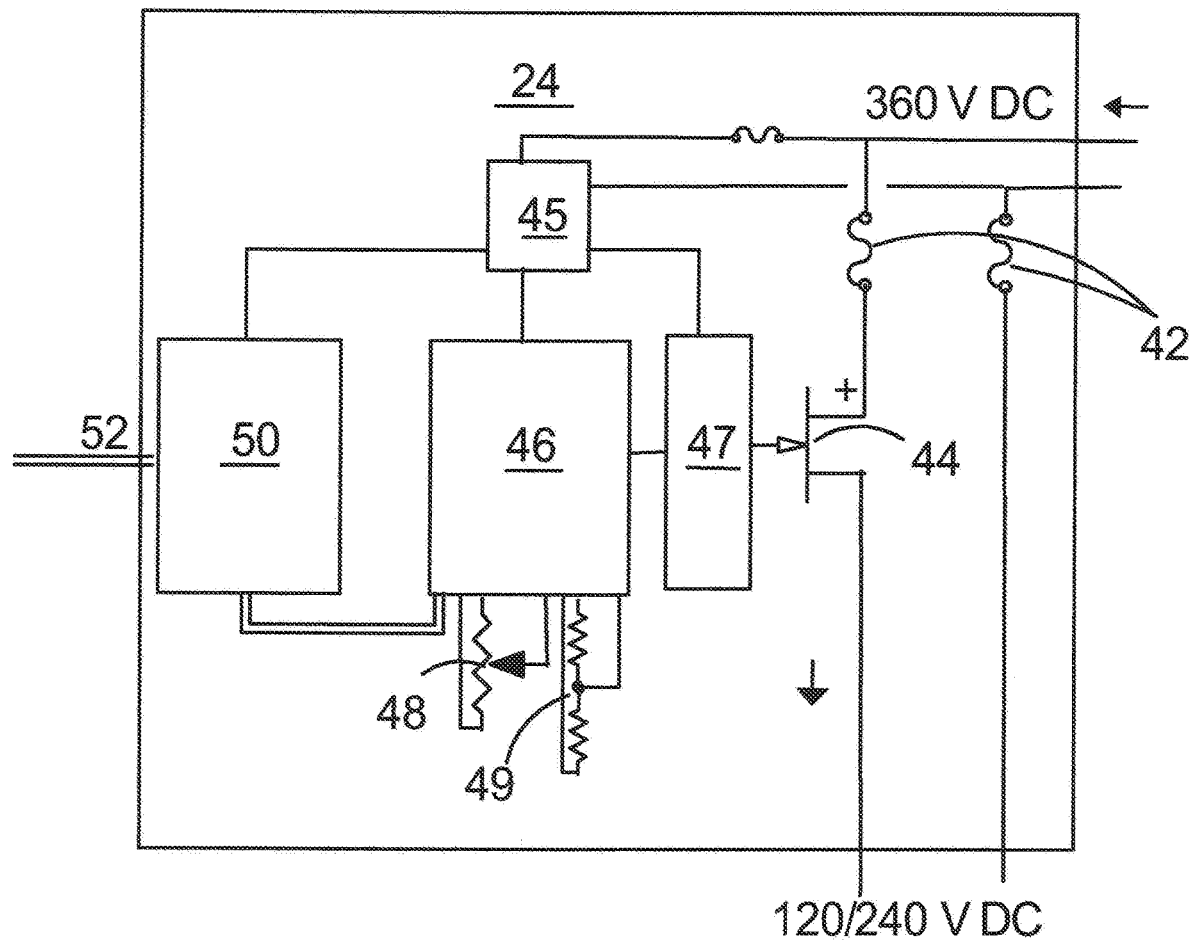

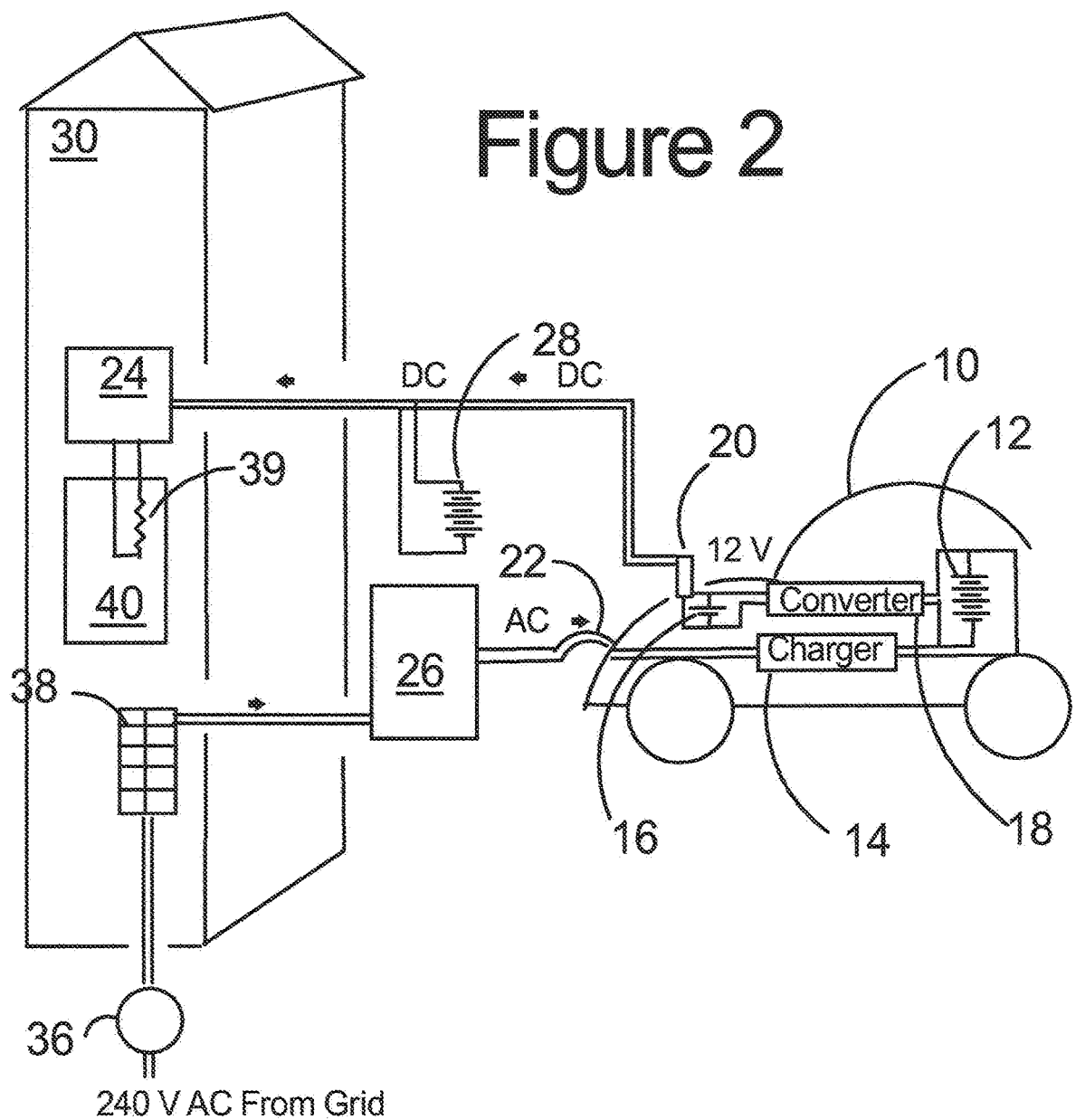

MINIMUM COST DEMAND CHARGE MANAGEMENT BY ELECTRIC VEHICLES

CROSS-REFERENCE TO RELATED APPLICATIONS

This application is related to U.S. Patent Application "Vehicle-Solar-Grid Integration" Ser. No. 14/101,423 filed Dec. 10, 2013, now issued as U.S. Pat. No. 9,566,867, Feb. 14, 2017, by the present inventor, and Provisional Patent Applications "Bidirectional Power Electronic Interface" No. 61/889,067, filed Oct. 10, 2013, "Bidirectional Power Electronic Interface with Sustaining Power" 61/921,583, filed Dec. 30, 2013, "Vehicle-Solar-Grid Integration with Supplementary Battery" 62/050,819, filed Sep. 16, 2014, "Low-Cost EVPV for Vehicle-Solar-Grid Integration", 62/297,462, filed Feb. 19, 2016, "Minimum Cost EVPV for Vehicle-Solar-Grid Integration" 62/299,756, filed Feb. 25, 2016, later filed as nonprovisional patent application Ser. No. 15/441,484, Feb. 24, 2017, and Ser. No. 16/562,565, Sep. 3, 2019, "Vehicle-Solar-Grid Integration for Back up Power" 62/465,424 filed Mar. 1, 2017 now filed as non provisional patent application Ser. No. 16/044,683 and Application "Non Grid-tied Vehicle-Solar Uninterruptable Power System" 62/544,041, filed Aug. 11, 2017, now filed as patent application Ser. No. 16/055,035, and "Demand Charge Management by Electric Vehicles", 62/721,216, filed Aug. 22, 2018 by the present inventor and "Multiple Load Micro-Grid Implementation of Vehicle-Solar-Grid Integration" 62/320,701, filed Apr. 11, 2016, by the present inventor and Brian R. Hamilton of Cranbury, NJ, and Chris A. Martin of Media, PA.

FEDERALLY SPONSORED RESEARCH

None

CITED LITERATURE

SAE J-1772 Standard for Electric Vehicle Charging Equipment, Revised October, 2012.

PATENT CITATIONS

High Level Control Systems
  U.S. Pat. No. 9,948,101, Apr. 17, 2018, Chow et al. "Passive Peak Reduction Systems and Networks", assigned to Green Charge Networks.
  U.S. Pat. No. 10,007,259, Jun. 26, 2018, Turney et al, "Systems and Methods for Energy Cost Optimization in a Building System", assigned to Johnson Controls.
  see also U.S. Pat. Nos. 9,852,481, and 9,436,179 by the same inventor.
  U.S. Pat. No. 10,137,796, Nov. 27, 2018, Huang et al "Control System for Electric Vehicle Charging Station and Method Thereof", assigned to ABB.
  also
  U.S. Pat. No. 10,126,796, Nov. 13, 2018, Dorn & Malcolm
  U.S. Pat. No. 9,783,068, Oct. 10, 2017, Eger, assigned to Siemens
Stationary Inverters
  U.S. Pat. No. 10,173,543, Jan. 8, 2019, Yang et al, "Charging System for Electric Vehicle and Method for Controlling Charging of Electric Vehicle" assigned to BYD automotive. Also
  U.S. Pat. No. 10,166,882, Jan. 1, 2019, Yang et al
  U.S. Pat. No. 10,166,877 Jan. 1, 2019, Zeng et al
  U.S. Pat. No. 9,862,287 Jan. 9, 2018, Tang et al
  U.S. Pat. No. 9,845,021 Dec. 19, 2017, Yang et al assigned to BYD
  U.S. Pat. No. 9,821,669, Nov. 21, 2017, Tanabe, assigned to Panasonic
On Board Inverter
  U.S. Pat. No. 9,584,047, Feb. 28, 2017 Frohman, assigned to Engineered Electric Co.
DC Charging from Stationary Converter
  U.S. Pat. No. 9,481,259, Nov. 1, 2016, Choi et al, "Bidirectional Vehicle Charging Apparatus and Operating Method Therefore" assigned to Lisis Co, Ltd.

BACKGROUND OF THE INVENTION

Commercial and Industrial electric service is typically billed in two major categories, Energy at so much per kiloWatt hour (kWh) and Demand (Power) at so much per kiloWatt (kW). The logic of this is that producing the energy is costly in terms of variable costs of fuel and labor valued in terms of $ per kWh, while delivering the energy to the user is costly in terms of the fixed investment in power plants, transmission and distribution equipment, all of which is valued in terms of $/kW. Ultimately residential service, now usually billed solely in terms of $/kWh, may introduce demand charges because of the logic of the situation.

A feature of demand charging is that it penalizes peaks in demand, which is again logical because serving the demand requires equipment that can serve the peak, even if it is idle most of the time. Typically the demand charge is levied on the maximum demand over any 15-minute period in a monthly billing cycle. Some utilities increase the penalty by billing for the maximum over the following six to twelve months known as "ratcheting".

Examples of loads that can produce peaks in demand are inductive loads such as air conditioners and other large motors that run intermittently. There are also major resistive loads such as electric furnaces, hot water heaters, and space heaters that operate intermittently. All of these loads by imposing a high demand for a short time, particularly those which are operative only occasionally, will cause an excessive demand charge relative to their actual energy consumption and usefulness, representing an inefficiency in the overall energy delivery system.

Demand charges incentivize anything that serves to level the load, reduce peaks and improve efficiency. Battery storage of electric energy can do this. A one kWh battery can spread a 15-minute load of 4 kW over an entire hour, thereby reducing the demand to 1 kW for a 75% saving in demand charge. The problem with battery storage is that it is expensive. The one kWh of capacity can cost anything up to $1000 to install.

Electric Vehicles (EV)s embody massive battery storage capability. The new generation of 200 mile range EVs typically have 60 kWh of capacity or more. If EVs can be utilized to provide electric energy storage at places of employment or residence during the time when load peaks are encountered, they can potentially level the load by bidirectional energy flow without affecting their range, life or utility as vehicles. It is an object of this invention to show how this may be done in an optimal manner. It is a further object of this invention to show how this may be done at minimum cost using only the existing equipment of the electric vehicle for resistive loads, which can be powered by DC electric energy. Success will provide the benefits of significant electric storage capability by the vehicle battery, an asset which is already paid for by virtue of serving another purpose, namely transportation.

BRIEF SUMMARY OF THE INVENTION

The objectives of this invention are obtained by supplying electric energy to intermittent loads from the batteries of parked electric vehicles via a bidirectional (two way) electrical connection between the vehicle(s) and the load(s). In this way the vehicles can be recharged following use and simultaneously provide useful electric energy storage to level the load at the location where they are parked.

The energy to recharge the vehicle batteries is supplied by Alternating Current (AC) power from the grid through an Electric Vehicle Service Equipment (EVSE) to the onboard battery charger in the usual way. The load leveling energy is supplied to the load as Direct Current (DC) power either directly via the vehicle quick charge port or indirectly through the vehicle low voltage accessory battery system.

In the case of resistive loads such as heaters, if the voltage requirement of the heater matches the voltage available from the vehicle, or can be chosen to do so, the DC energy may be used directly, since resistance devices work equally well on DC or AC. This approach saves the cost of an inverter, and makes for a very simple and inexpensive solution.

BRIEF DESCRIPTION OF THE DRAWINGS

FIG. 1B shows the internals of the circuit protection and control assembly in the DC connection to serve DC loads.

FIG. 1C shows the internals of the circuit protection and control assembly to serve AC loads.

FIG. 2 shows this invention with the DC connection made through the 12 V accessory battery of the electric vehicle thereby tapping the energy stored in the main propulsion battery indirectly through the onboard DC-DC converter.

DETAILED DESCRIPTION OF THE INVENTION: THE PREFERRED EMBODIMENT

Figure 1:
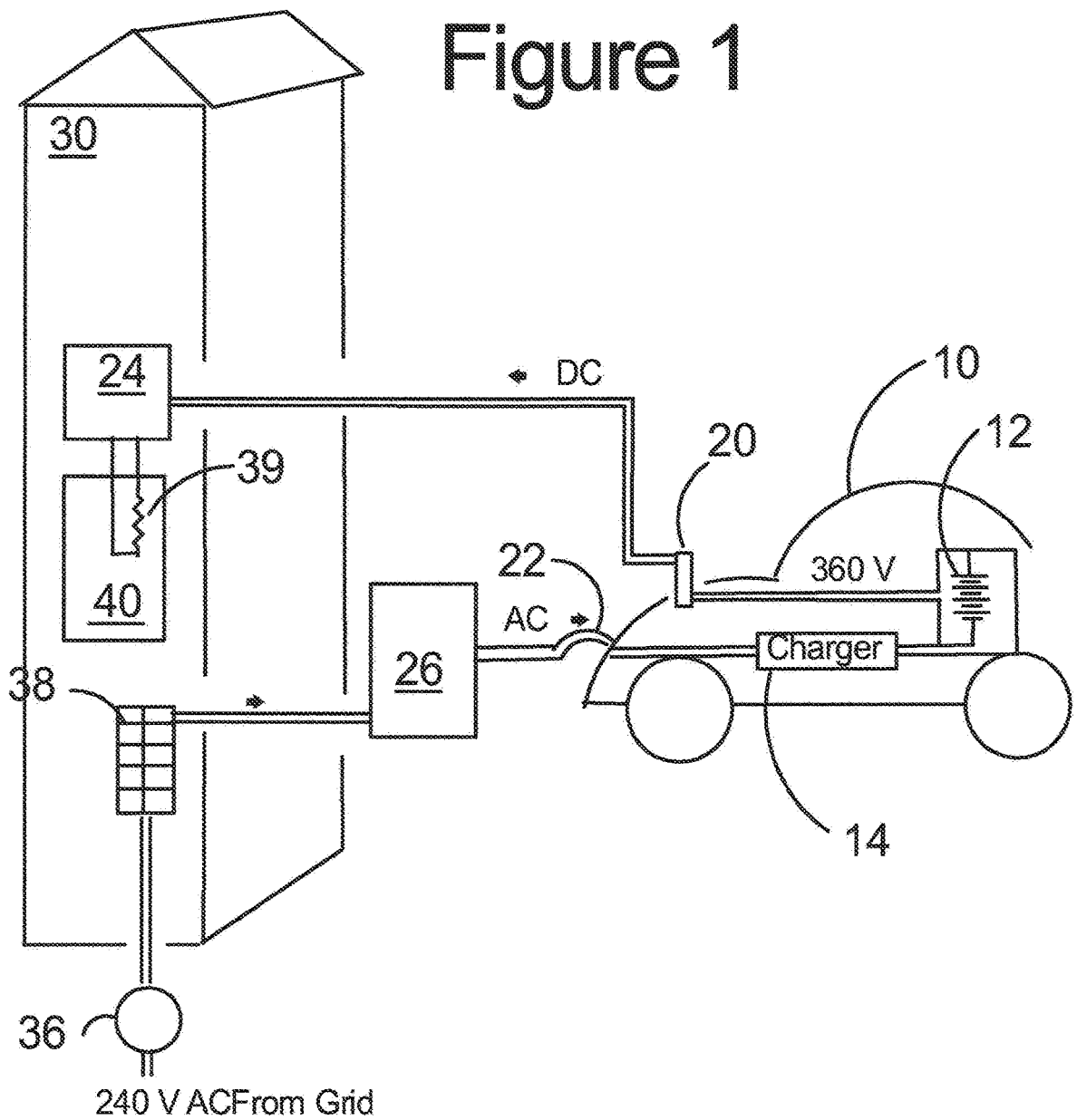
FIG. 1 is a schematic diagram of the invention showing an Electric Vehicle connected to a building via a conventional AC EVSE for recharging and a DC connection via the vehicle's quick charge port and a circuit protection and control assembly to supply an intermittent load.

FIG. 1 shows an electric vehicle 10 with a main propulsion battery 12 having a capacity of 20-60 kWh at approximately 360V DC. Battery 12 is recharged by on-board charger 14 with AC energy from SAE J1772-compliant plug and receptacle 22 and Electric Vehicle Service Equipment 26. EVSE 26 receives its energy from distribution panel 38 connected to the electric grid through meter 36. The AC power flow for recharging is controlled by on-board charger 14 in the usual way to supply constant (maximum) current up to a high battery state of charge. The current is then reduced to complete the charge at constant voltage. There may be other steps programmed into 14 by the vehicle manufacturer. This invention does not modify or control the charging process, which proceeds as if the vehicle were otherwise unattached.

In applying this invention battery 12 additionally supplies DC electric energy through quick charge port 20, which will conform to standard DC quick charge protocols such as the Japanese CHAdeMO, US/European CCS or Tesla Supercharger standards. The DC electric energy flows through circuit protection and control assembly 24 to intermittent load 40 containing resistive heater 39. The electrical energy demand of load 40 is still controlled by its internal control, such as a thermostat, which is in series with the output of control assembly 24. The result is that the intermittent large demands of load 40 are supplied by a constant AC supply from panel 38 through EVSE 26 plug 22 and charger 14 with battery 12 acting to average the load and avoid costly peaks in demand for AC power.

For example if load 40 is a water heater in a commercial building with a capacity of 10 kW and during the eight hour day the building uses 10 gallons of hot water per hour, the heater will be on for fifteen minutes in every hour and with a typical demand charge of $10 per kW, the associated demand charge will be $100 per month. With 10 kWh of battery storage the average power can be reduced to a steady 2.5 kW for a monthly saving of $75. With 60 kWh of storage the entire 20 kWh load can be spread over 24 hours for an average power of 0.83 kW and a saving of $91.70 in demand charge. If in the example the heater is on all the time during the day and off at night a vehicle battery with a capacity of 60 kWh can still cut the demand charge by 66% provided that it is connected all day, recharged at night and run only morning and evening.

Figure 1A:
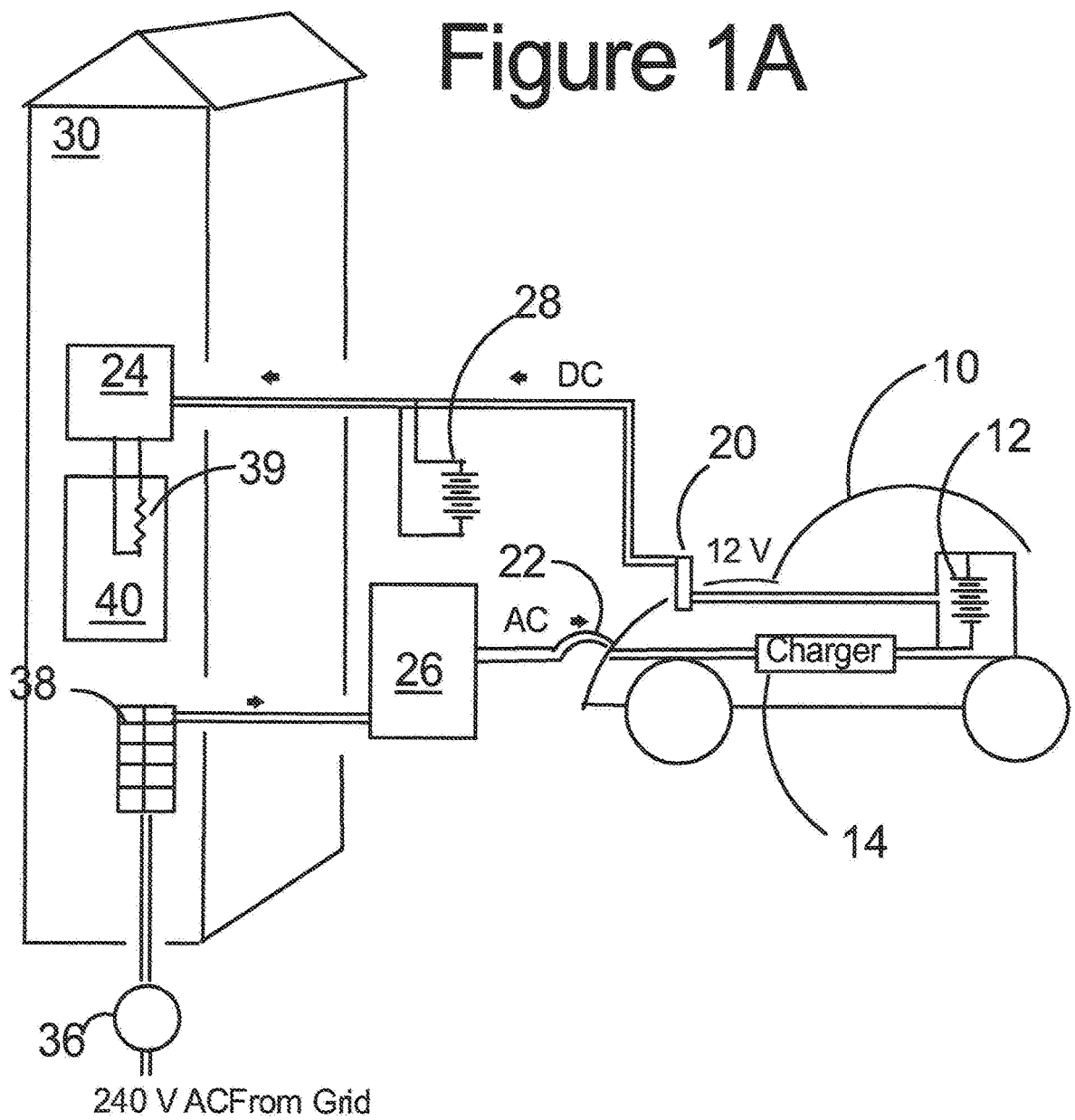
FIG. 1A shows the same apparatus with the addition of a stationary battery to provide power when the vehicle is not present.
Figure 1:
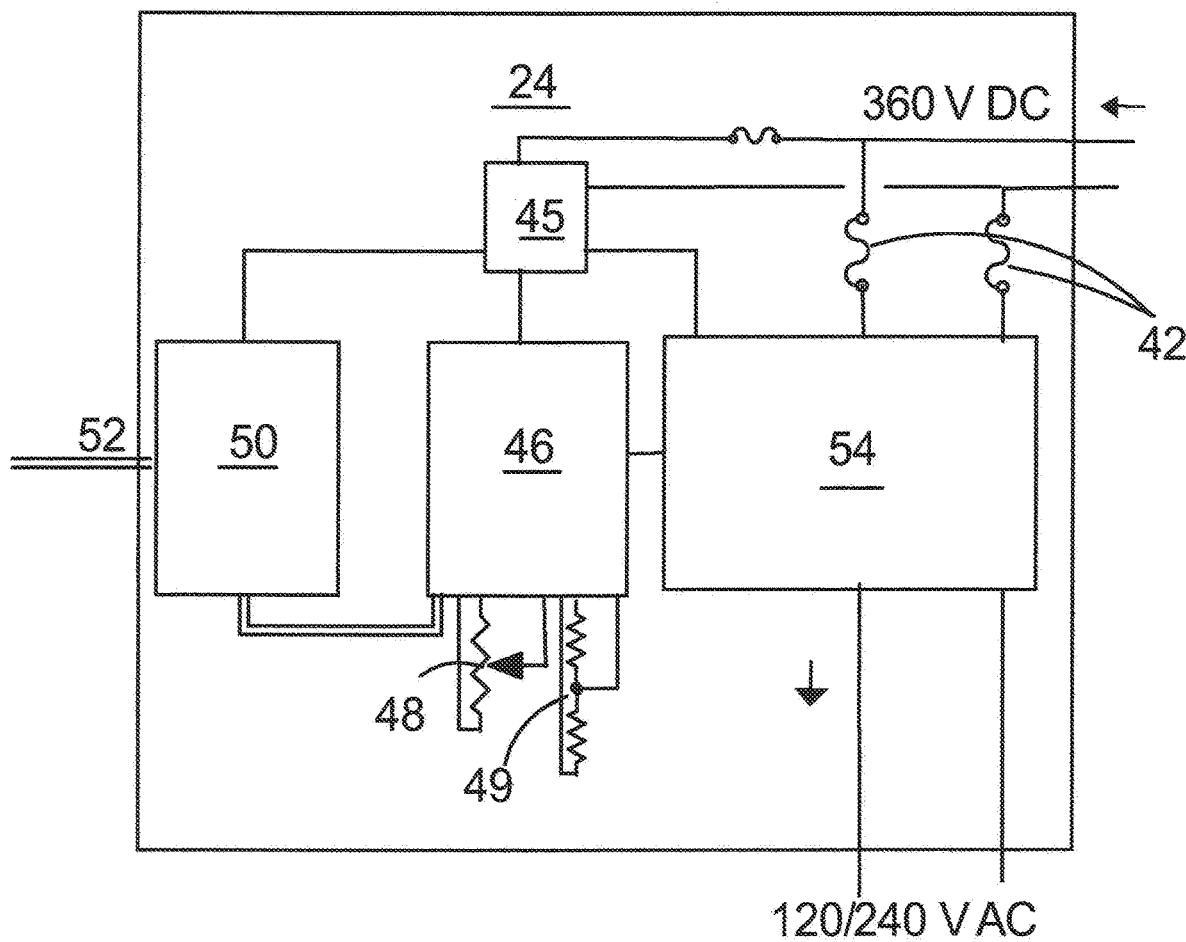

In FIG. 1A stationary battery 28 is added to the input of load 40 to provide energy when vehicle 10 is away from its recharging station. Battery 28 must be rated at the same voltage as battery 12, and ideally could be a used vehicle battery of the same type and voltage but less capacity because of age and prior use. Battery 28 is recharged in parallel with vehicle propulsion battery 12.

Additional intermittent loads may be connected in parallel with intermittent load 40. As many loads can be supplied as the vehicle battery and supplementary battery 28 can support. The power capability of the EV battery is over 100 kW and the quick charge port is rated at least at 50 kW. Over the course of a day the energy limit is imposed by the onboard charger, which has to make up the average of the intermittent load as well as the vehicle recharge requirement based on miles driven. Typical on board chargers are rated at 6.7 kW and above.

In FIG. 1B the internals of circuit protection and control assembly 24 are shown schematically. In the case where heater 39 is a DC heater with a voltage rating equal to the voltage of battery 12 or can be chosen to be so, control unit 24 may comprise only fuses 42 to provide circuit protection to the heater or other DC load. Fuses 42 may be any DC rated fuse such as UL rated Class CC fuses rated at 500 V DC and up to 30 Amps (10.8 kW at 360 V).

In cases where heater 39 cannot readily be matched to the voltage of battery 12, circuit and protection unit 24 contains control unit 46 which acts as a Pulse Width Modulated (PWM) generator to power semiconductor 44 which interrupts current in the DC circuit to lower its effective voltage below that of the vehicle battery voltage. Semiconductor switch 44 may be either a Power MOSFET or an Insulated Gate Bipolar Transistor (IGBT) such as the International Rectifier IRG4PC450 UD series rated at 600 V and 40 Amps. IGBTs are preferred in this slow switching, high voltage application.

Control unit 46 may be any eight-bit programmable controller with capabilities equivalent to an Arduino that can provide a PWM signal to turn on IGBT 44. The ATMEGA AVR series or the Microchip ADM series are suitable. A gate driver 47 to amplify the gate signal to 15 V such as the ZETEX ZXGD3005E6 will be needed. Energy from the DC circuit through fuse-protected power supply 45 will need to deliver 25 V to driver 47 and 5 V to controller 46 and to switch 50, if installed. Power supply 45 could be powered by 120 V AC from panel 38 or other means than the high voltage DC circuit shown. To match the EV battery voltage to the load requirement the PWM function will need to provide a pulse width equal to the ratio of either the 240 V or 120 V rating of heater 39 to the EV battery voltage. For example; Pulse width=240/360=67%.

The pulse width output on many controllers can be controlled by a variable resistive input to the controllers. Two such inputs are shown in FIG. 1B. Potentiometer 48 provides for an adjustable PWM output and effective DC voltage output from control assembly 24. Voltage divider 49 can provide a fixed PWM output with the individual resistors chosen so that R1 is proportional to 240 V and R1+R2 is proportional to EV battery voltage. Control unit 46 can supply several output drivers to support loads at different voltages if desired.

Control unit 46 can be programmed to operate load 40 at any time desired to provide for the needs of the building or to minimize demand during peak load hours. Controller 46 can also be controlled dynamically by communication device 50 in response to signals sent over connection 52. Control assembly 24 can cause load 40 to consume more energy at times of high availability and low cost and consume less in times of deficient capacity and high cost, in accordance with data made available over connection 52. Communication device 50 may be an Ethernet interface board compatible with controller 46 and connection 52 may be an Ethernet cable to a router, a WiFi antenna, or a cell phone receiver.

FIG. 1C shows the same apparatus configured to serve AC loads. IGBT drivers such as the ON Semiconductor STK5Q4U362J-E are available with six IGBTs embedded in them, which can put out three phase AC from a DC input. They can even improve on conventional inverters by providing variable frequency AC power to drive pumps and compressors more efficiently.

OTHER EMBODIMENTS

FIG. 2 is similar to FIG. 1A except that the DC connection is made through 12 V accessory battery 16 and DC-DC converter 18 of Vehicle 10. This approach provides a universal means of DC connection to any EV, but with the power from the vehicle limited to approximately one kW at 12 V. This may be acceptable if battery 28 can provide the power required by intermittent load 39 while the energy required is less than the 24 kWh per day that can be supplied via the accessory battery. Accessory battery voltages are slated to rise to as much as 48 V in future years.

Available vehicle battery storage provides a back up power source for the building in the event of a grid outage. Evaluating this is difficult but for many buildings, such as health care facilities, it is essential and must be provided in some fashion. Again, the fact that the vehicle battery is already paid for can provide major cost saving.

PRIOR ART

The idea of battery storage to provide the various advantages listed above is by no means novel. There are recent US patents awarded for demand charge management. Chow and Turney cited above are primarily concerned with predicting demand and planning to meet it optimally, without specifying the methods or apparatus to do that.

There are a number of patents in which bidirectional energy flow from a vehicle is described, but many of them involve a stationary inverter to convert DC to AC as in Huang and Yang above. Frohman describes a similar system with the inverter on-board the vehicle and AC power flowing to and from the vehicle. Choi shows a similar system with a stationary converter and DC power flowing from and to the vehicle.

This invention discloses a specific method of connecting an electric vehicle to a building to utilize its battery for demand charge management and other purposes, and specific apparatus to do so. The unique features of his invention are believed to be:
1. Simultaneous connection to the vehicle via a preexisting J-1772 AC charging port and either a standard quick charge bidirectional DC port such a the Japanese CHAdeMO standard or the CCS US-European standard, or through the 12 V auxiliary battery system of the EV.
2. Provision of electric energy to a building as DC to operate voltage-matched resistive loads without the necessity for an inverter to provide AC power or a DC-DC converter to match voltage.
3. Extremely low cost power electronics to match DC voltage or to supply an AC load.

While the drawings and descriptions in this application are intended to be comprehensive, it will be understood by those skilled in the art that there are similar means to achieve the same ends, which fall within the claimed scope of this invention.

I claim:

1. An electrical integration apparatus comprising:
an Electric Vehicle Service Equipment (EVSE) providing Alternating Current (AC) electric energy to an on board charger to recharge an electric vehicle propulsion battery, and
a Direct Current (DC) connection for direct or indirect access to the vehicle propulsion battery, to withdraw DC energy from the battery, which when simultaneously connected to the said EVSE and DC connection allows simultaneous power flow to and from an electric vehicle by connection to both an on board AC battery charger and to the vehicle propulsion battery to provide AC power to recharge the vehicle battery and DC electric power to a building through a circuit protection and control assembly such that a steady flow of AC power can be used to serve a larger intermittent DC load
wherein said load is a resistive load chosen to have a voltage requirement matched to a voltage of the DC electric power supplied by the vehicle propulsion battery and directly connected to the DC connection without any voltage equalizing equipment.

2. An electrical integration apparatus comprising:
an Electric Vehicle Service Equipment (EVSE) providing Alternating Current (AC) electric energy to an on board charger to recharge an electric vehicle propulsion battery, and
a Direct Current (DC) connection for direct or indirect access to the vehicle propulsion battery, to withdraw DC energy from the battery, which when simultaneously connected to the said EVSE and DC connection allows simultaneous power flow to and from an electric vehicle by connection to both an on board AC battery charger and to the vehicle propulsion battery to provide AC power to recharge the vehicle battery and DC electric power to a building through a circuit protection and control assembly such that a steady flow of AC power can be used to serve a larger intermittent DC load
wherein said circuit protection and control assembly includes one or more voltage equalizing subassemblies comprising:
a power supply;
a controller having one or more Pulse Width Modulating (PWM) outputs and one or more driver circuits taking PWM commands and outputting respective gate signals to one or more power semiconductors which can interrupt the flow of DC current to provide a DC power output with an effective DC voltage matching the requirements of respective resistive loads.

3. The apparatus of claim 2 which includes one or more Integrated driver/power semiconductor circuits which can take a PWM signal and provide a DC power output with an effective DC voltage matching the requirements of a resistive load.

4. The apparatus of claim 2 which includes one or more Integrated driver/power semiconductor circuits which can take a PWM signal from the controller and provide an AC power output with an effective AC Voltage matching the requirements of an inductive load.

5. The apparatus of claim 2 which includes communication equipment to permit remote control of the apparatus.

6. The apparatus of claim 2 which includes one or more revenue-grade meters.

7. A method of using an apparatus, said apparatus comprising:
an Electric Vehicle Service Equipment (EVSE) providing Alternating Current (AC) electric energy to an on board charger to recharge an electric vehicle propulsion battery, and
a Direct Current (DC) connection for direct or indirect access to the vehicle propulsion battery, to withdraw DC energy from the battery, which when simultaneously connected to the said EVSE and DC connection allows simultaneous bidirectional power flow to and from an electric vehicle by connection to both an on board AC battery charger and to the vehicle propulsion battery to provide AC power to recharge the vehicle battery and DC electric power to a building through a circuit protection and control assembly such that a steady flow of AC power can be used to serve a larger intermittent DC load;
the method comprising the steps of:
installing the apparatus in relation to a building, simultaneously connecting an electric vehicle via the AC connection to the EVSE and the DC connection to the circuit protection and control assembly of the apparatus, connecting the circuit protection and control assembly of the apparatus to one or more intermittent loads in the building, and
using the apparatus to consume a steady amount of AC electric energy from the building and to simultaneously provide a variable output of DC electric energy to the said intermittent loads wherein said bidirectional flow of electric energy from the vehicle is dynamically controlled in response to an external signal and used to provide demand charge management services to the building/vehicle owner by control of the energy supplied to the load.

8. A method of using an apparatus, said apparatus comprising:
an Electric Vehicle Service Equipment (EVSE) providing Alternating Current (AC) electric energy to an on board charger to recharge an electric vehicle propulsion battery, and
a Direct Current (DC) connection for direct or indirect access to the vehicle propulsion battery, to withdraw DC energy from the battery, which when simultaneously connected to the said EVSE and DC connection allows simultaneous bidirectional power flow to and from an electric vehicle by connection to both an on board AC battery charger and to the vehicle propulsion battery to provide AC power to recharge the vehicle battery and DC electric power to a building through a circuit protection and control assembly such that a steady flow of AC power can be used to serve a larger intermittent DC load
wherein said bidirectional flow of electric energy from and to the vehicle is dynamically and remotely controlled and used to provide demand response and frequency regulation services to the grid and revenue to the building/vehicle owner by control of the energy supplied to the load.

* * * * *